J. I. WILSON.
Land-Marker.
No. 52,482.
Patented Feb. 6, 1866.
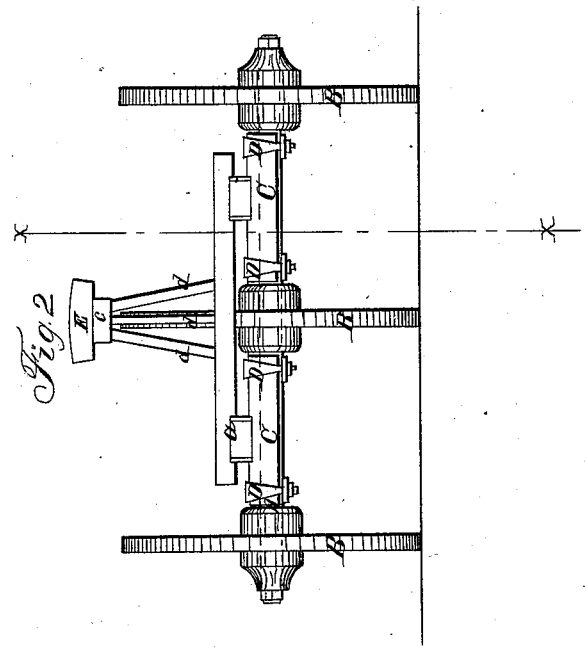
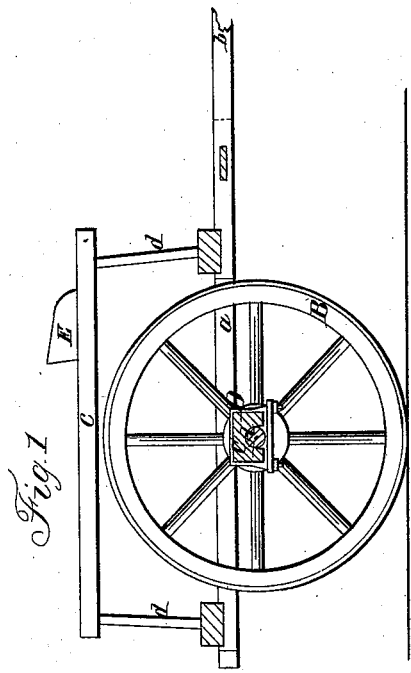

UNITED STATES PATENT OFFICE.

JOHN I. WILSON, OF ABINGDON, ILLINOIS.

IMPROVEMENT IN FURROWING-MACHINES.

Specification forming part of Letters Patent No. 52,482, dated February 6, 1866.

*To all whom it may concern:*

Be it known that I, JOHN I. WILSON, of Abingdon, in the county of Knox and State of Illinois, have invented a new and Improved Furrowing or Marking Device; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a rear view of the same.

Similar letters of reference indicate corresponding parts.

This invention relates to a new and improved device for furrowing or marking land for the planting of corn and other seed in check-rows.

The invention consists in having an axle provided with three wheels placed at equal distances apart, the axle having a draft-pole connected to it and a proper framing formed to support a driver's seat, all being arranged as hereinafter set forth, whereby three furrows may be made simultaneously and the work of furrowing or marking land for the purpose specified greatly expedited.

A represents an axle, which may be constructed of iron, and has three wheels, B, placed on it at suitable distances apart, the wheels being allowed to turn loosely on the axle.

C C are two wooden beds, which are secured on the axle A, between the wheels, by means of clips D, and to these wooden beds a light framing, $a$, and the draft-pole $b$ are attached, a driver's seat, E, being placed on a bar, $c$, which is on supports $d$ attached to the framing.

As the machine is drawn along it will be seen that the wheels B will make three marks equidistant from each other, and consequently the furrowing or marking may be rapidly done and in a very perfect manner. A man with a span of horses can mark or furrow with ease thirty acres of land in a day, which is about one-third more than can be done with the furrowing devices now in use.

The device is of very easy draft on account of wheels being used as markers. These wheels readily penetrate the soft plowed earth and leave a distinct mark.

Having thus described my invention, I claim as new and desire to secure by Letters Patent—

A furrowing or marking device composed of a plurality of wheels placed on an axle and arranged with a draft-pole and driver's seat, substantially as herein shown and described.

JOHN I. WILSON.

Witnesses:
    ELIJAH F. PURDUM,
    JAMES L. WOOD.